United States Patent
Luo et al.

(10) Patent No.: US 12,223,180 B2
(45) Date of Patent: Feb. 11, 2025

(54) MEMORY CHIP, OPERATING METHOD THEREOF, AND JUDGING METHOD

(71) Applicant: WUHAN XINXIN SEMICONDUCTOR MANUFACTURING CO., LTD., Hubei (CN)

(72) Inventors: Yini Luo, Hubei (CN); Sahun Song, Hubei (CN)

(73) Assignee: WUHAN XINXIN SEMICONDUCTOR MANUFACTURING CO., LTD., Hubei (CN)

( * ) Notice: Subject to any disclaimer, the term of this patent is extended or adjusted under 35 U.S.C. 154(b) by 66 days.

(21) Appl. No.: 18/074,542

(22) Filed: Dec. 5, 2022

(65) Prior Publication Data

US 2024/0118812 A1 Apr. 11, 2024

(30) Foreign Application Priority Data

Sep. 29, 2022 (CN) .......................... 202211213282.4

(51) Int. Cl.
*G06F 3/06* (2006.01)

(52) U.S. Cl.
CPC .......... *G06F 3/0619* (2013.01); *G06F 3/0652* (2013.01); *G06F 3/0653* (2013.01); *G06F 3/0679* (2013.01)

(58) Field of Classification Search
CPC .... G06F 3/0652; G06F 3/0653; G06F 3/0679; G06F 3/0619
USPC .......................................................... 711/154
See application file for complete search history.

(56) References Cited

U.S. PATENT DOCUMENTS

| | | | |
|---|---|---|---|
| 2002/0126528 A1* | 9/2002 | Conley .................. | G11C 16/10 365/185.04 |
| 2006/0045130 A1* | 3/2006 | Kim ...................... | H04L 1/1685 370/469 |
| 2010/0082927 A1* | 4/2010 | Riou ....................... | G06F 12/14 711/163 |
| 2023/0067457 A1* | 3/2023 | Xu .................... | G11C 29/12005 |

* cited by examiner

*Primary Examiner* — Gautam Sain
(74) *Attorney, Agent, or Firm* — Rivka Friedman (57) ABSTRACT

The present application discloses a memory chip, an operating method thereof, and a judging method. The operating method of the memory chip includes steps of: constructing the memory chip including at least two nonvolatile register groups, wherein each of the nonvolatile register groups includes a flag register and at least one register, and stored data of each of flag registers is configured to indicate at least one storage state of the at least one register in a same one of the nonvolatile register groups. obtaining the stored data of at least one of the flag registers; judging whether the stored data of the at least one of the flag registers is random code; and erasing all of the nonvolatile registers if the stored data of the at least one of the flag registers is the random code.

20 Claims, 5 Drawing Sheets

MEMORY CHIP, OPERATING METHOD THEREOF, AND JUDGING METHOD

FIELD

The present application relates to a field of storage technology, specifically to a memory chip, an operating method thereof, and a judging method.

BACKGROUND

When a power failure phenomenon occurs in a process of erasing memory chips, there is a risk that stored data of a flag register becomes random code, and that the stored data of the flag register is misjudged during a power on scanning process, resulting in errors of reading address and/or writing address.

SUMMARY

The present application provides a memory chip, an operating method thereof, and a judging method, so as to solve a technical problem related to errors in reading address and/or writing address that is generated in a process of erasing stored data of flag registers caused by power failure.

In a first aspect, the present application provides an operating method of a memory chip, the operating method includes steps of: constructing the memory chip including at least two groups of nonvolatile registers, wherein each group of the nonvolatile registers includes a flag register and at least one data register, and stored data of each of flag registers is configured to indicate at least one storage state of the at least one data register in a same group of the nonvolatile registers; obtaining the stored data of at least one of the flag registers; judging whether the stored data of the at least one of the flag registers is random code; and erasing all of the nonvolatile registers if the stored data of the at least one of the flag registers is the random code.

In some embodiments, the step of obtaining the stored data of the at least one of the flag registers includes a step of: reading the stored data of each of the flag registers in all of the nonvolatile registers; the step of judging whether the stored data of the at least one of the flag registers is the random code includes a step of: judging whether the stored data of the flag register in any group of the nonvolatile registers is non-0x00 and is non-0xFF; and the step of erasing all of the nonvolatile registers if the stored data of the at least one of the flag registers is the random code includes steps of: recording the stored data of the at least one data register in a last group of the nonvolatile registers that is in a non-writable state to a buffer and erasing all of the nonvolatile registers, if the stored data of the flag register in any group of the nonvolatile registers is non-0x00 and is non-0xFF.

In some embodiments, after the step of judging whether the stored data of the at least one of the flag registers is the random code, the operating method further includes steps of: reading the stored data of each of the flag registers in the nonvolatile registers according to an address sequence from a first group of the nonvolatile registers to a last group of the nonvolatile registers, if the stored data of each of the flag registers in all of the nonvolatile registers is not the random code; judging whether the stored data of the flag register in a current group of the nonvolatile registers is 0xFF; judging whether the current group of the nonvolatile registers is the last group of the nonvolatile registers, if the stored data of the flag register in the current group of the nonvolatile registers is non-0xFF; recording the stored data of the at least one data register in the last group of the nonvolatile registers that is in a non-writable state to a buffer before erasing all of the nonvolatile registers, if the current group of the nonvolatile registers is the last group of the nonvolatile registers; and writing data to be written to the first group of the nonvolatile registers, wherein the data to be written includes flag data, an un-updated part of the stored data stored in the buffer, and data to be updated; the flag data is written to the flag register in the first group of the nonvolatile registers, the un-updated part of the stored data stored in the buffer is correspondingly written to at least one data bit that do not need to be updated in the first group of the nonvolatile registers, and the data to be updated is correspondingly written to at least one data bit that needs to be updated in the first group of the nonvolatile registers.

In some embodiments, after the step of judging whether the current group of the nonvolatile registers is the last group of the nonvolatile registers if the stored data of the flag register in the current group of the nonvolatile registers is non-0xFF, the operating method further includes steps of: scanning the at least one storage state of a next group of the nonvolatile registers if the current group of the nonvolatile registers is not the last group of the nonvolatile registers, and switching to the step "judging whether the stored data of the flag register in the current group of the nonvolatile registers is 0xFF".

In some embodiments, after the step of judging whether the stored data of the flag register in the current group of the nonvolatile register is 0xFF, the operating method further includes steps of: judging whether the current group of the nonvolatile registers is the first group of the nonvolatile registers, if the stored data of the flag register in the current group of the nonvolatile registers is 0xFF; directly writing the data to be written to the first group of the nonvolatile registers, if the current group of the nonvolatile registers is the first group of the nonvolatile registers; and recording the stored data of the flag register in a previous group of the current group of the nonvolatile registers to the buffer, and writing data to be written to the current group of the nonvolatile registers, if the current group of the nonvolatile registers is not the first group of the nonvolatile registers, wherein the data to be written stored in the current group of the nonvolatile registers includes flag data, an un-updated part of the stored data stored in the buffer, and data to be updated; the flag data is written to the flag register in the current group of the registers, the un-updated part of the stored data stored in the buffer is correspondingly written to at least one data bit that do not need to be updated in the current group of the nonvolatile registers, and the data to be updated is correspondingly written to at least one data bit that needs to be updated in the current group of the nonvolatile registers.

In some embodiments, the step of obtaining the stored data of the at least one of the flag registers further includes a step of: reading the stored data of the flag registers from a first group of the nonvolatile registers to a last group of the nonvolatile registers according to an address sequence; the step of judging whether the stored data of the at least one of the flag registers is the random code further includes steps of: judging whether the stored data of the flag register in a current group of the nonvolatile registers is 0x00; judging whether the stored data of the flag register in the current group of the nonvolatile registers is 0xFF, if the stored data of the flag register in the current group of the nonvolatile registers is non-0x00; and the step of the step of erasing all of the nonvolatile registers of the stored data of the at least one of the flag registers is the random code further includes steps of: recording the stored data of the at least one data register in the last group of the nonvolatile registers that is in a non-writable state to a buffer, and erasing all of the nonvolatile registers, if the stored data of the flag register in the current group of the nonvolatile registers is non-0xFF.

In some embodiments, after the step of judging whether the stored data of the flag register in the current group of the nonvolatile registers is 0x00, the operating method further includes steps of: judging whether the current group of the nonvolatile registers is the last group of the nonvolatile registers, if the stored data of the flag register in the current group of the nonvolatile registers is 0x00; and reading the stored data of the flag register in a remaining group of the nonvolatile registers, and switching to the step "judging whether the stored data of the flag register in the current group of the nonvolatile registers is 0x00", if the current group of the nonvolatile registers is not the last group of the nonvolatile registers.

In some embodiments, after the step of judging whether the current group of the nonvolatile registers is the last group of the nonvolatile registers if the stored data of the flag register in the current group of the nonvolatile registers is 0x00, the operating method further includes steps of: after recording the stored data of the at least one data register in the last group of the nonvolatile registers in the non-writable state to the buffer, erasing all of the nonvolatile registers, and writing data to be written to the first group of the nonvolatile registers, if the current group of the nonvolatile registers is the last group of the nonvolatile registers; wherein the data to be written includes flag data, an un-updated part of the stored data stored in the buffer, and data to be updated; the flag data is written to the flag register in the first group of the nonvolatile registers, the un-updated part of the stored data stored in the buffer is correspondingly written to at least one data bit that do not need to be updated in the first group of the nonvolatile registers, and the data to be updated is correspondingly written to at least one data bit that needs to be updated in the first group of the nonvolatile registers.

In some embodiments, after a step of judging whether the stored data of the flag register in the current group of the nonvolatile registers is 0xFF, if the stored data of the flag register in the current group of the nonvolatile registers is non-0x00, the operating method further includes steps of: storing a storage address of the current group of the nonvolatile registers, if the stored data of the flag register in the current group of the nonvolatile registers is 0xFF; reading the stored data of the flag register in the remaining group of the nonvolatile registers; judging whether the stored data of the flag register in the remaining group of the nonvolatile registers is the random code; judging whether the current group of the nonvolatile registers corresponding to the storage address in a step "storing the storage address of the current group of the nonvolatile registers if the stored data of the flag register in the current group of the nonvolatile registers is 0xFF" is the first group of the nonvolatile registers, if the stored data of the flag register in the remaining group of the nonvolatile registers is not the random code; and directly writing the data to be written to the at least one data register of the current group of the nonvolatile registers, if the current group of the nonvolatile registers is the first group of the nonvolatile registers.

In some embodiments, after the step of judging whether the current group of the nonvolatile registers corresponding to the storage address is the first group of the nonvolatile registers, the operating method further includes steps of: recording the stored data of the at least one data register in a previous group of the nonvolatile registers to the buffer, and writing data to be written to the current group of the nonvolatile registers, if the current group of the nonvolatile registers is not the first group of the nonvolatile registers; wherein the data to be written stored in the current group of the nonvolatile registers includes flag data, an un-updated part of the stored data stored in the buffer, and data to be updated; the flag data is written to the flag register in the current group of the nonvolatile registers, the un-updated part of the stored data stored in the buffer is correspondingly written to at least one data bit that do not need to be updated in the current group of the nonvolatile registers, and the data to be updated is correspondingly written to at least one data bit that needs to be updated in the current group of the nonvolatile registers.

In some embodiments, after the step of judging whether the stored data of the flag register in the remaining group of the nonvolatile registers is the random code, the operating method further includes steps of: switching to the step "recording the stored data of the at least one data register in the last group of the nonvolatile registers in the non-writable state to the buffer, and erasing all of the nonvolatile registers", if the stored data of the flag register in the remaining group of the nonvolatile registers is the random code; and writing the data to be written to the first group of the nonvolatile registers.

In some embodiments, the random code are data being non-0x00 and being non-0xFF.

In a second aspect, the present application provides a memory chip, the memory chip includes at least two groups of nonvolatile registers, an obtaining module, a judgment module, and a selective erasure module; wherein each group of the nonvolatile registers includes a flag register and at least one data register, and stored data of each of flag registers is configured to indicate at least one storage state of the at least one data register in a same group of the nonvolatile registers; the obtaining module is configured to obtain the stored data of at least one of the flag registers; the judgment module is configured to judge whether the stored data of the at least one of the flag registers is random code; and the selective erasure module is configured to erase all of the nonvolatile registers in response to the stored data of the at least one of the flag registers being the random code.

In some embodiments, the memory chip further includes a first reading unit, a first judgment unit, and a first selective erasure unit; wherein the first reading unit is configured to read the stored data of each of the flag registers in all of the nonvolatile registers; the first judgment unit is configured to judge whether the stored data of the flag register in any group of the nonvolatile registers is non-0x00 and is non-0xFF; and the first selective erasure unit is configured to record the stored data of the at least one data register in a last group of the nonvolatile registers that is in a non-writable state to a buffer in response to a fact that the stored data of the flag register in any group of the nonvolatile registers is non-0x00 and is non-0xFF.

In some embodiments, the memory chip further includes a second reading unit, a second judgment unit, and a second selective erasure unit; wherein the second reading unit is configured to read the stored data of the flag registers from a first group of the nonvolatile registers to a last group of the nonvolatile registers according to an address sequence; the second judgment unit is configured to judge whether the stored data of the flag register in a current group of the nonvolatile registers is 0x00; if the stored data of the flag register in the current group of the nonvolatile registers is non-0x00, judging whether the stored data of the flag register in the current group of the nonvolatile registers is 0xFF; and if the stored data of the flag register in the current group of the nonvolatile registers is 0xFF, storing a storage address of the current group of the nonvolatile registers; and the second selective erasure unit is configured to record the stored data of the at least one data register in a last group of the nonvolatile registers that is in a non-writable state to a buffer, and to erase all of the nonvolatile registers in response to a fact that the stored data of the flag register in the current group of the nonvolatile registers is non-0xFF.

In a third aspect, the present application provides a judging method of whether power failure occurs in an erasing process, the judging method includes steps of: reading stored data of at least one flag bit in a group of nonvolatile registers; judging whether the stored data of the flag bit is random code; and judging whether the power failure occurs if the stored data of the flag bit is the random code.

In some embodiments, the judging method further includes steps of: constructing M groups of the nonvolatile registers, the M being an integer greater than or equal to 2; constructing each group of the nonvolatile registers to include a flag register and N data register, the N being an integer greater than or equal to 1; and constructing each of flag registers to include at least one flag bit.

In some embodiments, after the step of judging whether the power failure occurs if the stored data of the flag bit is the random code, the judging method further includes a step of erasing all of the nonvolatile registers.

In some embodiments, after the step of judging whether the power failure occurs if the stored data of the flag bit is the random code, the judging method further includes a step of erasing corresponding groups of the nonvolatile registers where the stored data of the flag bit is the random code.

In the operating method of the memory chip provided by the present application, by obtaining and judging whether the stored data of the at least one of the flag registers is the random code during a power on process, it can indicate whether a power failure phenomenon occurs in an erasing process. If the stored data of the at least one of the flag registers is the random code, erasing the stored data of all of the nonvolatile registers, so that the random code caused by power failure in the erasing process can be eliminated, thereby avoiding the technical problem related to the errors in reading address and/or writing address.

In addition, compared with the related art that 0 or 1 is configured to indicate the power failure phenomenon in the erasing process, in the present application, the random code "non-0x00 and non-0xFF" are configured to indicate the power failure phenomenon in the erasing process, which expands identification approaches of the power failure phenomenon in the erasing process. At the same time, compared with 0 and 1, since the non-0x00 and the non-0xFF are configured to have more binary bits, changes of any of the binary bits can indicate the power failure phenomenon in the erasing process, and the multiple binary bits can jointly indicate the power failure phenomenon in the erasing process, thereby expanding identification ranges of the power failure phenomenon.

BRIEF DESCRIPTION OF DRAWINGS

Technical solutions and effects of the present application will be obvious through a detailed description of specific embodiments of the present application in combination with accompanying drawings.

DETAILED DESCRIPTION

Technical solutions in embodiments of the present application will be illustrated in combination with drawings in the embodiments of the present application clearly and completely. Obviously, the illustrated embodiments are only a part of the embodiments of the present application, not all of them. Based on the embodiments in the present application, all other embodiments obtained by those skilled in the art without creative effort belong to a scope of the present application.

Figure 1:
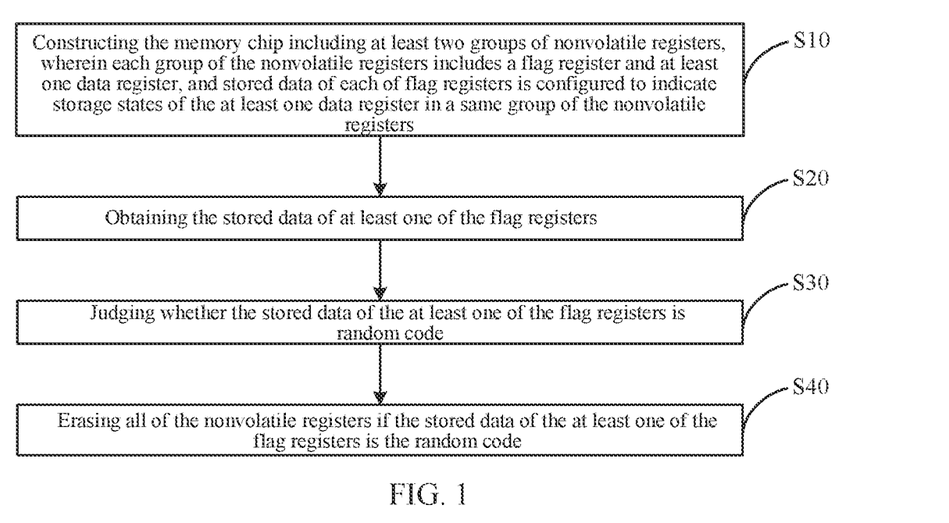
FIG. 1 is a first flow chart of an operating method provided by an embodiment of the present application.
Figure 2:
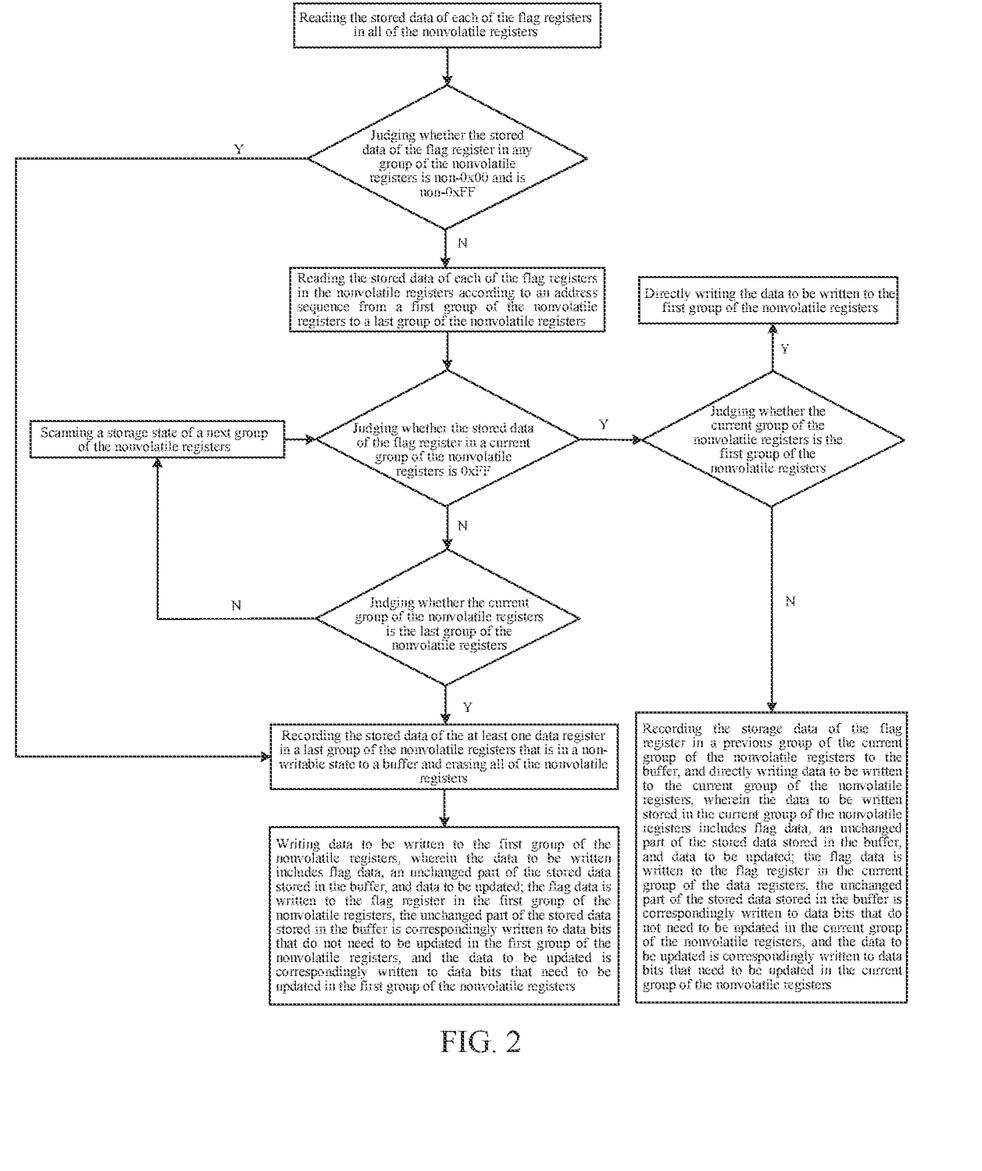
FIG. 2 is a second flow chart of the operating method provided by the embodiment of the present application.
Figure 3:
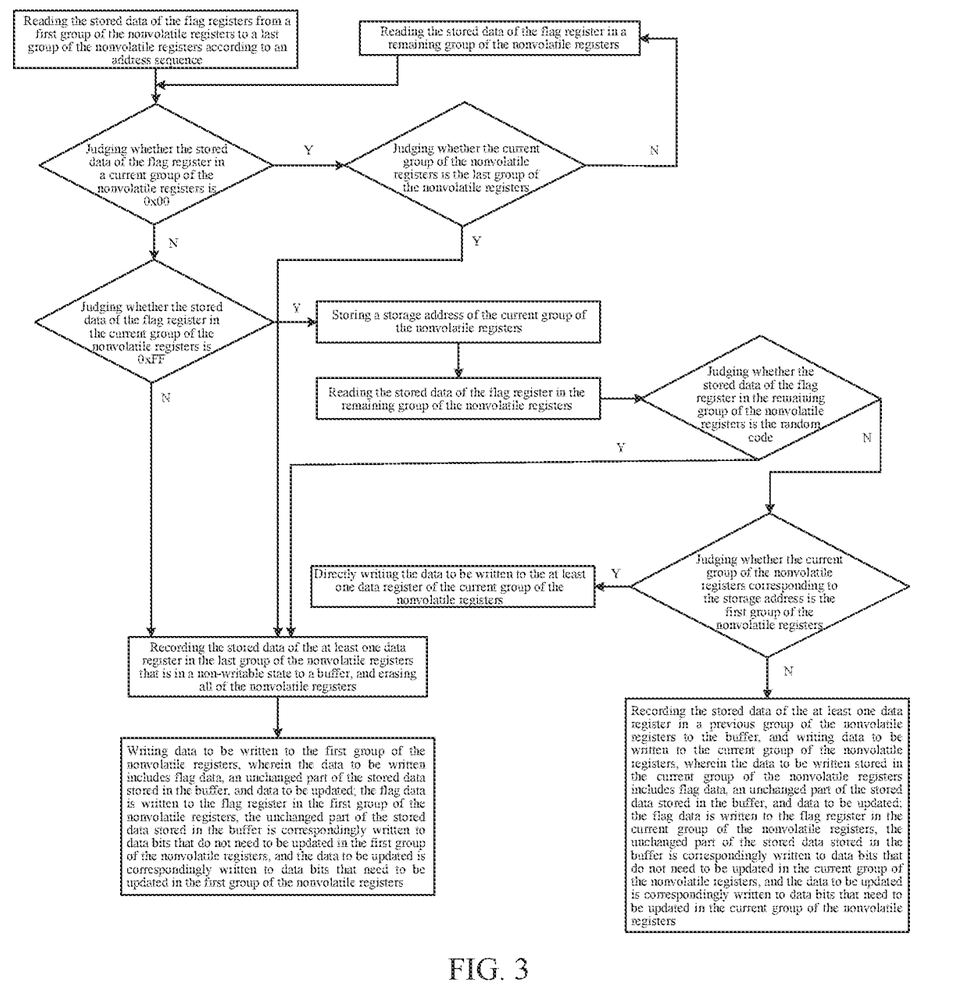
FIG. 3 is a third flow chart of the operating method provided by the embodiment of the present application.

In view of a technical problem of errors in reading address and/or writing address that is generated in a process of erasing stored data of flag registers caused by power failure, an embodiment provides an operating method of a memory chip. Please refer to FIG. 1 to FIG. 7. As shown in FIG. 1 to FIG. 3, the operating method includes following steps:

step S10: constructing the memory chip including at least two groups of nonvolatile registers, wherein each group of the nonvolatile registers includes a flag register and at least one data register, and stored data of each of flag registers is configured to indicate storage states of the at least one data register in a same group of the nonvolatile registers.

step S20: obtaining the stored data of at least one of the flag registers.

step S30: judging whether the stored data of the at least one of the flag registers is random code.

step S40: erasing all of the nonvolatile registers if the stored data of the at least one of the flag registers is the random code.

In the operating method of the memory chip provided by the present application, by obtaining and judging whether the stored data of the at least one of the flag registers is the random code during a power on process, it can indicate whether a power failure phenomenon occurs in an erasing process. If the stored data of the at least one of the flag registers is the random code, erasing the stored data of all of the nonvolatile registers, so that the random code caused by power failure in the erasing process can be eliminated, thereby avoiding the technical problem related to the errors in reading address and/or writing address.

In addition, compared with the related art that 0 or 1 is configured to indicate the power failure phenomenon in the erasing process, in the present application, the random code "non-0x00 and non-0xFF" are configured to indicate the power failure phenomenon in the erasing process, which expands identification approaches of the power failure phenomenon in the erasing process. At the same time, compared with 0 and 1, since the non-0x00 and the non-0xFF are configured to have more binary bits, changes of any of the binary bits can indicate the power failure phenomenon in the erasing process, and the multiple binary bits can jointly indicate the power failure phenomenon in the erasing process, thereby expanding identification ranges of the power failure phenomenon.

It should be noted that 0x00 is hexadecimal data, and can be converted into corresponding binary data, namely 00000000. 0xFF is hexadecimal data, and can be converted into corresponding binary data, namely 11111111. Non-0x00 is data different from the binary data of 00000000, such as 00000001, 000000010, etc. Non-0xFF is data different from the binary data of 11111111, such as 00000100, 00000101, etc.

The above storage states may include a writable state and a written state. The writable state is configured to indicate a blank state of the at least one data register of the nonvolatile registers, and is an unwritten state. In the unwritten state, data to be written may be written to. In some embodiments, the storage states of all of data registers are the unwritten state. The writable state may be represented by the stored data of the flag registers in the nonvolatile registers as 0xFF, such as 11111111. The written state is configured to indicate a state that corresponding data has been written to the at least one data register of the nonvolatile registers, and the data to be written may be written again after being erased. The written state may be represented by the stored data of the flag registers in the nonvolatile registers as 0x00, such as 00000000.

In one embodiment, definitions of values 00 (0x00) and FF (0xFF) of the stored data stored in the flag registers may be vary according to types of the flag registers, that is, 00 may indicate the writeable state of the flag registers, and the FF may indicate the written state of the flag registers. Therefore, simple changes of the values of the stored data stored in the flag registers may further be included in a scope of the present application.

In some embodiments, storage space of all of the nonvolatile registers is independent of storage space of a storage array of the memory chip, that is, the storage space of the two are non-overlapping and independent.

In one embodiment, as shown in FIG. 2, the above operating method may further include steps of: reading the stored data of each of the flag registers in all of the nonvolatile registers; judging whether the stored data of the flag register in any group of the nonvolatile registers is non-0x00 and is non-0xFF; and recording the stored data of the at least one data register in a last group of the nonvolatile registers that is in a non-writable state to a buffer and erasing all of the nonvolatile registers, if the stored data of the flag register in any group of the nonvolatile registers is non-0x00 and is non-0xFF.

It should be noted that an above reading method of the stored data of each of the flag registers in all of the nonvolatile registers may be operated one by one. In some embodiments, the stored data of all of data registers in the last group of the nonvolatile registers in the non-writable state is recorded to the buffer. The non-writable state refers to a state in which the stored data of the flag registers in the nonvolatile registers is non-0xFF or non-1 (1 here means 1 in binary), that is, the non-writable state refers to a state in which the stored data of the flag registers in the nonvolatile registers is random code or is 0x00.

It can be understood that this embodiment can read the stored data of all flag registers in all of the nonvolatile registers after the memory chip is powered on. When the stored data of any of the flag registers is non-0x00 and is non-0xFF, it means that powered failure occurs in a process of erasing the at least one flag register. At this time, the random code caused by the power failure can be eliminated by performing the erasing process on all of the nonvolatile registers, so as to avoid subsequent errors in reading address and/or writing address. It should be noted that in order to improve erasure efficiency and save a design area, when the stored data of any of the flag registers contains data other than 0x00 and 0xFF, erasing all of the nonvolatile registers.

In one embodiment, the random code are data being non-0x00 and being non-0xFF.

It should be noted that the random code means that a value of a storage bit or a flag bit in the flag register is neither 0 nor 1. When the storage bits or the flag bits in the flag register is eight bits, 00 can be written to or all the eight bits is erased to be FF, then it is neither FF nor 00.

In one embodiment, as shown in FIG. 2, after the step of judging whether the stored data of the at least one of the flag registers is the random code, the operating method further includes steps of: reading the stored data of each of the flag registers in the nonvolatile registers according to an address sequence from a first group of the nonvolatile registers to a last group of the nonvolatile registers, if the stored data of each of the flag registers in all of the nonvolatile registers is not the random code; judging whether the stored data of the flag register in a current group of the nonvolatile registers is 0xFF; judging whether the current group of the nonvolatile registers is the last group of the nonvolatile registers, if the stored data of the flag register in the current group of the nonvolatile registers is non-0xFF; recording the stored data of the at least one data register in the last group of the nonvolatile registers that is in a non-writable state to a buffer before erasing all of the nonvolatile registers, if the current group of the nonvolatile registers is the last group of the nonvolatile registers; and writing data to be written to the first group of the nonvolatile registers, wherein the data to be written includes flag data, an un-updated part of the stored data stored in the buffer, and data to be updated; the flag data is written to the flag register in the first group of the nonvolatile registers, the un-updated part of the stored data stored in the buffer is correspondingly written to data bits that do not need to be updated in the first group of the nonvolatile registers, and the data to be updated is correspondingly written to data bits that need to be updated in the first group of the nonvolatile registers.

It should be noted that the at least two groups of the nonvolatile registers may include the first group of the nonvolatile registers to the last group of the nonvolatile registers. Storage addresses corresponding to storage space from the first group of the nonvolatile registers to the last group of the nonvolatile registers can be arranged in sequence, for example, from a small one to a large one, or from the large one to a small one. The above address sequence is a sequence of the storage addresses corresponding to the first group of the nonvolatile registers to the last group of the nonvolatile registers.

In some embodiments, after the stored data of all of the registers in the last group of the nonvolatile registers that is in the non-writable state is recorded to the buffer, erasing all of the nonvolatile registers.

Figure 7:
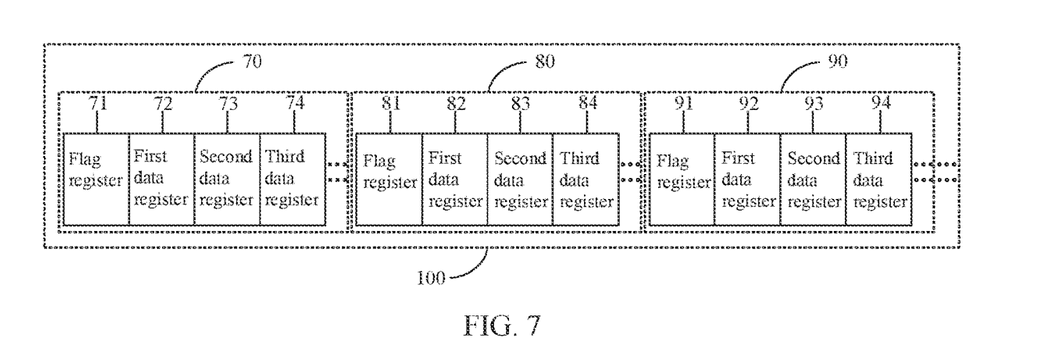
FIG. 7 is a schematic structural diagram of nonvolatile registers provided by an embodiment of the present application.

Taking the memory chip shown in FIG. 7 as an example, since a first nonvolatile register group 70 is the first group of the nonvolatile registers, and a storage state of the first nonvolatile register group 70 is the writable state, the data to be written can be directly written to the first nonvolatile register group 70. For example, the data to be written is written to at least one of a first data register, a second data register, and a third data register of the first nonvolatile register group 70, and "0x00" is written to a flag register 71 of the first nonvolatile register group 70 to update the storage state of the first nonvolatile register group 70.

In one embodiment, as shown in FIG. 2, after the step of judging whether the current group of the nonvolatile registers is the last group of the nonvolatile registers if the stored data of the flag register in a current group of the nonvolatile registers is not 0xFF, the operating method further includes steps of: scanning storage states of a next group of the nonvolatile registers if the current group of the nonvolatile registers is not the last group of the nonvolatile registers, and switching to the step "judging whether the stored data of the flag register in the current group of the nonvolatile registers is 0xFF".

In one embodiment, as shown in FIG. 2, after the step of judging whether the stored data of the flag register in the current group of the nonvolatile registers is 0xFF, the operating method further includes steps of: judging whether the current group of the nonvolatile registers is the first group of the nonvolatile registers, if the stored data of the flag register in the current group of the nonvolatile registers is 0xFF; directly writing the data to be written to the first group of the nonvolatile registers, if the current group of the nonvolatile registers is the first group of the nonvolatile registers; and recording the stored data of the flag register in a previous group of the current group of the nonvolatile registers to the buffer, and writing data to be written to the current group of the nonvolatile registers, if the current group of the nonvolatile registers is not the first group of the nonvolatile registers; wherein the data to be written stored in the current group of the nonvolatile registers includes flag data, an un-updated part of the stored data stored in the buffer, and data to be updated; the flag data is written to the flag register in the current group of the registers, the un-updated part of the stored data stored in the buffer is correspondingly written to data bits that do not need to be updated in the current group of the nonvolatile registers, and the data to be updated is correspondingly written to data bits that need to be updated in the current group of the nonvolatile registers.

It should be noted that the data to be written may be written after finding a group of the nonvolatile registers that is in the writable state in this embodiment.

In one embodiment, as shown in FIG. 3, the step 20 further includes a step of: reading the stored data of the flag registers from the first group of the nonvolatile registers to the last group of the nonvolatile registers according to an address sequence; the step of judging whether the stored data of the at least one of the flag registers is the random code further includes steps of: judging whether the stored data of the flag register in the current group of the nonvolatile registers is 0x00; if the stored data of the flag register in the current group of the nonvolatile registers is non-0x00, judging whether the stored data of the flag register in the current group of the nonvolatile registers is 0xFF; and the step of erasing all of the nonvolatile registers if the stored data of the at least one of the flag registers is the random code further includes steps of: recording the stored data of the at least one data register in the last group of the nonvolatile registers that is in a non-writable state to a buffer, and erasing all of the nonvolatile registers, if the stored data of the flag register in the current group of the nonvolatile registers is non-0xFF.

It should be noted that the stored data of the flag register in each group of the nonvolatile registers may be read one by one in this embodiment. When it is found that the stored data of the flag register in the nonvolatile registers is the random code during a reading process, erasing all of the nonvolatile registers.

In the operating method of the memory chip provided by the present application, by obtaining and judging whether the stored data of the at least one of the flag registers is the random code during a power on process, it can indicate whether a power failure phenomenon occurs in an erasing process. If the stored data of the at least one of the flag registers is the random code, erasing the stored data of all of the nonvolatile registers, so that the random code caused by power failure in the erasing process can be eliminated, thereby avoiding the technical problem related to the errors in reading address and/or writing address.

In one embodiment, as shown in FIG. 3, after the step of judging whether the stored data of the flag register in the current group of the nonvolatile registers is 0x00, the operating method further includes steps of: judging whether the current group of the nonvolatile registers is the last group of the nonvolatile registers, if the stored data of the flag register in the current group of the nonvolatile registers is 0x00; and reading the stored data of the flag register in a remaining group of the nonvolatile registers, and switching to the step "judging whether the stored data of the flag register in the current group of the nonvolatile registers is 0x00", if the current group of the nonvolatile registers is not the last group of the nonvolatile registers.

In one embodiment, as shown in FIG. 3, after the step of judging whether the current group of the nonvolatile registers is the last group of the nonvolatile registers if the stored data of the flag register in the current group of the nonvolatile registers is 0x00, the operating method further includes steps of: after recording the stored data of the at least one data register in the last group of the nonvolatile registers in the non-writable state to the buffer, erasing all of the nonvolatile registers, and writing data to be written to the first group of the nonvolatile registers, if the current group of the nonvolatile registers is the last group of the nonvolatile registers; wherein the data to be written includes flag data, an un-updated part of the stored data stored in the buffer, and data to be updated; the flag data is written to the flag register in the first group of the nonvolatile registers, the un-updated part of the stored data stored in the buffer is correspondingly written to data bits that do not need to be updated in the first group of the nonvolatile registers, and the data to be updated is correspondingly written to data bits that need to be updated in the first group of the nonvolatile registers.

It should be noted that in this embodiment, the flag data can be "0x00", so as to indicate storage states of corresponding groups of the nonvolatile registers as the written state.

Taking the memory chip shown in FIG. 7 as an example, storage states of a second nonvolatile register group 80 is the writable state. Since the second nonvolatile register group 80 is not the first group of the nonvolatile registers, the stored data of each of the data registers of the first nonvolatile register group 70 need to be recorded to the buffer. Taking stored data of the first data register 72, the second data register 73, and the third data register 74 of the first nonvolatile register group 70 being 0xFF, 0xFD, and 0xFC, respectively, as an example. If a lowest bit data of the stored data (0xFF, binary representation is 11111111) of the first data register 72 is changed from 1 to 0, all stored data of the data registers in the first nonvolatile register group 70 need to be written from the buffer to a corresponding data register of the second nonvolatile register group 80 except the lowest bit data of the first data register 72. For example, the flag data of 0x00 in the data to be written is written to the flag register 81, data of 1111111 in the first data register 72 is written to a first data register 82 of the second nonvolatile register group 80 except the lowest bit data of the first data register 72, the stored data of 0xFD in the second data register 73 is written to a second data register 83 of the second nonvolatile register group 80, and the stored data of 0xFC in the third data register 74 is written to a third data register 84 of the second nonvolatile register group 80. Wherein the data currently written to the first data register 82, the second data register 83, and the third data register 84 may be an un-updated part of the stored data stored in the buffer. In addition, data of 0 need to be written to a lowest bit of the first data register 82, and is the data to be updated in the above data to be written.

In one embodiment, as shown in FIG. 3, after the step of judging whether the stored data of the flag register in the current group of the nonvolatile registers is 0xFF, if the stored data of the flag register in the current group of the nonvolatile registers is non-0x00, the operating method further includes steps of: storing a storage address of the current group of the nonvolatile registers, if the stored data of the flag register in the current group of the nonvolatile registers is 0xFF; reading the stored data of the flag register in the remaining group of the nonvolatile registers; judging whether the stored data of the flag register in the remaining group of the nonvolatile registers is the random code; judging whether the current group of the nonvolatile registers corresponding to the storage address in a step "storing the storage address of the current group of the nonvolatile registers if the stored data of the flag register in the current group of the nonvolatile registers is 0xFF" is the first group of the nonvolatile registers, if the stored data of the flag register in the remaining group of the nonvolatile registers is not the random code; and directly writing the data to be written to the at least one data register of the current group of the nonvolatile registers, if the current group of the nonvolatile registers is the first group of the nonvolatile registers.

It should be noted that in this embodiment, the flag register with the stored data of 0xFF may be determined by only once scanning process, thus, a storage address of a corresponding group of the nonvolatile registers where the flag register with the stored data of 0xFF is located may be recorded. When the stored data of the flag register read on power is not the random code, data can be written to the nonvolatile registers corresponding to the storage address. Compared with reading the storage states of all of the nonvolatile registers first and then reading the storage states of each group of the nonvolatile registers one by one as shown in FIG. 2, a data rewriting process shown in FIG. 3 can save time and improve rewriting efficiency.

In some embodiments, the stored data of each of the data registers in a previous group adjacent to the current group of the nonvolatile registers in an address sequence is recorded to the buffer. It can be understood that the data registers are generally edited in the address sequence in the art, and of course, certain address segments may further be skipped.

In one embodiment, as shown in FIG. 3, after the step of judging whether the current group of the nonvolatile registers corresponding to the storage address is the first group of the nonvolatile registers, the operating method further includes steps of: recording the stored data of the at least one data register in the previous group of the nonvolatile registers to the buffer, and writing the data to be written to the current group of the nonvolatile registers, if the current group of the nonvolatile registers is not the first group of the nonvolatile registers; wherein the data to be written stored in the current group of the nonvolatile registers includes the flag data, the un-updated part of the stored data stored in the buffer, and data to be updated; the flag data is written to the flag register in the current group of the nonvolatile registers, the un-updated part of the stored data stored in the buffer is correspondingly written to the data bits that do not need to be updated in the current group of the nonvolatile registers, and the data to be updated is correspondingly written to the data bits that need to be updated in the current group of the nonvolatile registers.

In one embodiment, as shown in FIG. 3, after the step of judging whether the stored data of the flag register in the remaining group of the nonvolatile registers is the random code, the operating method further includes steps of: switching to the step "recording the stored data of the at least one data register in the last group of the nonvolatile registers in the non-writable state to the buffer, and erasing all of the nonvolatile registers", if the stored data of the flag register in the remaining group of the nonvolatile registers is the random code; and writing the data to be written to the first group of the nonvolatile registers; wherein the data to be written includes flag data, an un-updated part of the stored data stored in the buffer, and data to be updated; wherein the flag data is written to the flag register in the first group of the nonvolatile registers, the un-updated part of the stored data stored in the buffer is correspondingly written to data bits that do not need to be updated in the first group of the nonvolatile registers, and the data to be updated is correspondingly written to data bits that need to be updated in the first group of the nonvolatile registers.

Figure 4:
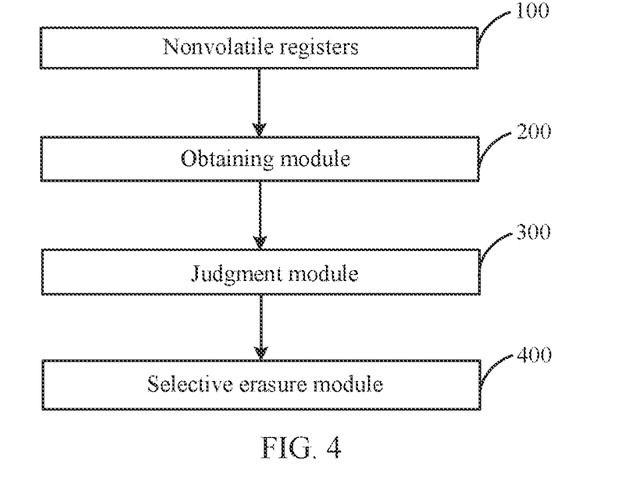
FIG. 4 is a first schematic structural diagram of a memory chip provided by an embodiment of the present application.

In one embodiment, as shown in FIG. 4, this embodiment provides a memory chip. The memory chip includes at least two groups of nonvolatile registers 100, an obtaining module 200, a judgment module 300, and a selective erasure module 400. Each group of the nonvolatile registers includes a flag register and at least one data register. Stored data of each of flag registers is configured to indicate storage states of the at least one data register in a same group of the nonvolatile registers. The obtaining module 200 is configured to obtain the stored data of at least one of the flag registers. The judgement module 300 is configured to judge whether the stored data of the at least one of the flag registers is random code. The selective erasure module 400 is configured to erase all of the nonvolatile registers in response to the stored data of the at least one of the flag registers being the random code.

In the memory chip provided by this embodiment, by obtaining and judging whether the stored data of the at least one of the flag registers is the random code during a power on process, it can indicate whether a power failure phenomenon occurs in an erasing process. If the stored data of the at least one of the flag registers is the random code, erasing the stored data of all of the nonvolatile registers, so that the random code caused by power failure in the erasing process can be eliminated, thereby avoiding the technical problem related to the errors in reading address and/or writing address.

In addition, compared with the related art that 0 or 1 is configured to indicate the power failure phenomenon in the erasing process, in the present application, the random code "non-0x00 and non-0xFF" are configured to indicate the power failure phenomenon in the erasing process, which expands identification approaches of the power failure phenomenon in the erasing process. At the same time, compared with 0 and 1, since the non-0x00 and the non-0xFF are configured to have more binary bits, changes of any of the binary bits can indicate the power failure phenomenon in the erasing process, and the multiple binary bits can jointly indicate the power failure phenomenon in the erasing process, thereby expanding identification ranges of the power failure phenomenon.

Figure 5:
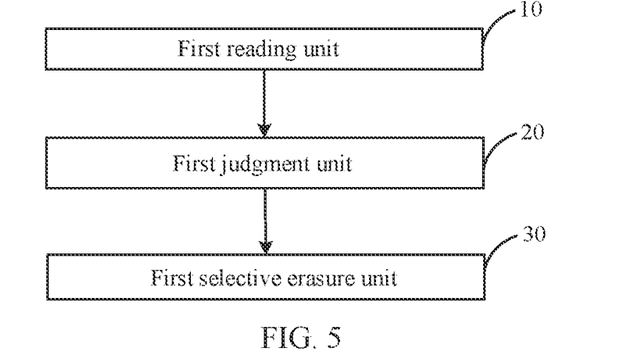
FIG. 5 is a second schematic structural diagram of the memory chip provided by the embodiment of the present application.

In one embodiment, as shown in FIG. 5, the memory chip further includes a first reading unit 10, a first judgment unit 20, and a first selective erasure unit 30. The first reading unit 10 is configured to read the stored data of each of the flag registers in all of the nonvolatile registers. The first judgement unit 20 is configured to judge whether the stored data of the flag register in any group of the nonvolatile registers is non-0x00 and is non-0xFF. The first selective erasing unit 30 is configured to record the stored data of the at least one data register in a last group of the nonvolatile registers that is in a non-writable state to a buffer in response to a fact that the stored data of the flag register in any group of the nonvolatile registers is non-0x00 and is non-0xFF.

It should be noted that the above reading method of the stored data of each of the flag registers in the at least two groups of the nonvolatile registers 100 can be carried out one by one.

It can be understood that this embodiment can read the stored data of all flag registers in all of the nonvolatile registers after the memory chip is powered on. When the stored data of any of the flag registers is non-0x00 and is non-0xFF, it means that powered failure occurs in a process of erasing the at least one flag register. At this time, the random code caused by the power failure can be eliminated by performing the erasing process on all of the nonvolatile registers, so as to avoid subsequent errors in reading address and/or writing address. It should be noted that in order to improve erasure efficiency and save a design area, when the stored data of any of the flag registers contains data other than 0x00 and 0xFF, erasing all of the nonvolatile registers.

Figure 6:
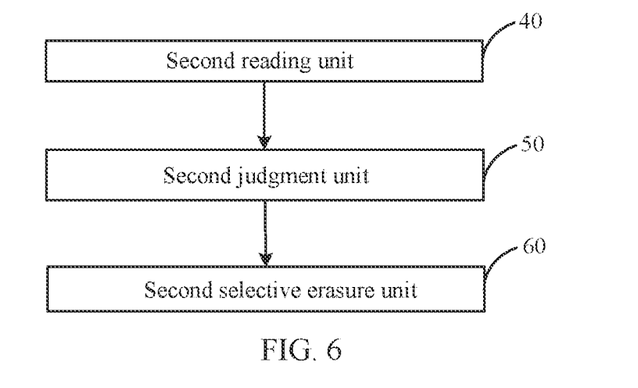
FIG. 6 is a third schematic structural diagram of the memory chip provided by the embodiment of the present application.

In one embodiment, as shown in FIG. 6, the memory chip further includes a second reading unit 40, a second judgment unit 50, and a second selective erasure unit 60. The second reading unit 40 is configured to read the stored data of the flag registers from a first group of the nonvolatile registers to a last group of the nonvolatile registers in an address sequence. The second judgement unit 50 is configured to judge whether the stored data of the flag register in a current group of the nonvolatile registers is 0x00. If the stored data of the flag register in the current group of the nonvolatile registers is not 0x00, judging whether the stored data of the flag register in the current group of the nonvolatile registers is 0xFF. If the stored data of the flag register in the current group of the nonvolatile registers is 0xFF, storing a storage address of the current group of the nonvolatile registers. The second selective erasure unit 60 is configured to record the stored data of the at least one data register in a last group of the nonvolatile registers that is in the non-writable state to the buffer, and to erases all of the nonvolatile registers in response to a fact that the stored data of the flag register in the current group of the nonvolatile registers is non-0xFF.

It should be noted that the stored data of the flag register in each group of the nonvolatile registers may be read one by one in this embodiment. When it is found that the stored data of the flag register in the nonvolatile registers is the random code during a reading process, erasing all of the nonvolatile registers.

It should be noted that, as shown in FIG. 7, the above at least two groups of nonvolatile registers 100 may further include a first nonvolatile register group 70 and a second nonvolatile register group 80. After performing one writing operation on the first nonvolatile register group 70 and the second nonvolatile register group 80, respectively, erasing the first nonvolatile register group 70 and the second nonvolatile register group 80 once again, so that writing times of the at least two groups of the nonvolatile registers 100 are 2, and erasure times of the at least two groups of the nonvolatile registers 100 are 1. It can be realized that the writing times of the at least two groups of the nonvolatile registers 100 are greater than the erasure times of the at least two groups of the nonvolatile registers 100, thereby improving reliability of the at least two groups of the nonvolatile registers 100. Wherein performing the one writing operation on a nonvolatile register group refers to performing the writing operation on at least one data register of the nonvolatile register group.

The at least two groups of the nonvolatile registers 100 further include a third nonvolatile register group 90. After performing one writing operation on the first nonvolatile register group 70, the second nonvolatile register group 80, and the third nonvolatile register group 90, respectively, erasing the first nonvolatile register group 70, the second nonvolatile register group 80, and the third nonvolatile register group 90 once again, so that the writing times of the at least two groups of the nonvolatile registers 100 are 3, and the erasure times of the at least two groups of the nonvolatile registers 100 are 1. It can be realized that the writing times of the at least two groups of the nonvolatile registers 100 are greater than the erasure times of the at least two groups of the nonvolatile registers 100, thereby improving the reliability of the at least two groups of the nonvolatile registers 100.

It can be understood that the nonvolatile registers may further include more groups of nonvolatile registers. Assuming an upper limit of erasable times of each of the flag registers or each data register is 900K, if the nonvolatile registers are configured to contain 32 groups of the nonvolatile registers, at least 32 times of writing operation can be performed every time erasing the nonvolatile registers. Correspondingly, equivalent erasing life of all of the nonvolatile registers is 9.6KK=32*900K times, far exceeding actual erasing life of 900K times before improvement.

Each group of the nonvolatile registers may include the flag register and the at least one data register. For example, the first nonvolatile register group 70 may include a flag register 71, a first data register 72, a second data register 73, and a third data register 74, etc. The second nonvolatile register group 80 may include a flag register 81, a first data register 82, a second data register 83, and a third data register 84, etc. The third nonvolatile register group 90 may include a flag register 91, a first data register 92, a second data register 93, and a third data register 94, etc.

Wherein a number of the data registers in each group of the nonvolatile registers may be equal. Storage capacity of each of the flag registers or each of the data registers may be one or more bytes. The storage capacity of the flag registers may further be one or more bits. "More" described in the present application refers to two or more than two.

It should be noted that the above memory chip may be, but is not limited to, NOR Flash or other flash memory that may be applied to the technical solutions of the present application.

In one embodiment, the present application provides a judging method of whether power failure occurs in an erasing process. The judging method includes steps of: reading stored data of at least one flag bit in a group of nonvolatile registers; judging whether the stored data of the flag bit is random code; and judging whether the power failure occurs if the stored data of the flag bit is the random code.

In this embodiment, by judging the stored data of the flag bits in the nonvolatile registers read out during or after a power on process, a power failure generated in the erasing process can be detected, thereby avoiding the errors in reading address and/or writing address.

In one embodiment, the judging method further includes steps of: constructing M groups of the nonvolatile registers, the M being an integer greater than or equal to 2; constructing each group of the nonvolatile registers to include a flag register and N data register, the N being an integer greater than or equal to 1; and constructing each of flag registers to include at least one flag bit.

In one embodiment, after the step of judging whether the power failure occurs if the stored data of the flag bit is the random code, the judging method further includes a step of erasing all of the nonvolatile registers.

In this embodiment, after finding an failed power failure, by erasing the stored data of all of the nonvolatile registers, the random code caused by the power failure can be eliminated in the erasing process, thereby avoiding the errors in reading address and/or writing address.

In one embodiment, after the step of judging whether the power failure occurs if the stored data of the flag bit is the random code, the judging method further includes a step of erasing corresponding groups of the nonvolatile registers where the stored data of the flag bit is the random code.

In this embodiment, after finding an failed power failure, by erasing the nonvolatile registers where the flag bit of the stored data is the random code, the random code caused by the power failure can be eliminated in the erasing process, thereby avoiding the errors in reading address and/or writing address. In addition, since not all of the nonvolatile registers are erased, erasing workload can further be reduced.

In the above embodiments, the description of each of the embodiment has its own emphasis. For a part not described in detail in one embodiment, please refer to relevant description of other embodiments.

The above describes the memory chip, the operating method thereof, and the judging method provided by the embodiments of the present application in detail. In the present application, specific examples are used to describe a principle and an implementation mode of the present application. The above description of the embodiments is only used to help understand technical solutions and a core idea of the present application; those skilled in the art should understand that they can still modify the technical solutions recorded in the aforementioned embodiments, or equivalent replace some of the technical features; however, these modifications or substitutions do not make a nature of corresponding technical solutions separate from a scope of the present application.

What is claimed is:

1. An operating method of a memory chip comprising steps of:
   constructing the memory chip comprising at least two groups of nonvolatile registers, wherein each group of the nonvolatile registers comprises a flag register and at least one data register, and stored data of each of flag registers is configured to indicate at least one storage state of the at least one data register in a same group of the nonvolatile registers;
   obtaining the stored data of at least one of the flag registers;
   judging whether the stored data of the at least one of the flag registers is random code, wherein the random code are data being non-0x00 and being non-0xFF, wherein 0x00 represents binary data of 00000000, 0xFF represents binary data of 11111111, the non-0x00 represents binary data other than 00000000, and the non-0xFF represents binary data other than 11111111; and
   erasing all of the nonvolatile registers in response to the stored data of the at least one of the flag registers being the random code;
   wherein the step of obtaining the stored data of the at least one of the flag registers further comprises a step of: reading the stored data of the flag registers from a first group of the nonvolatile registers to a last group of the nonvolatile registers according to an address sequence; and
   wherein the step of judging whether the stored data of the at least one of the flag registers is the random code further comprises steps of:
   judging whether the stored data of the flag register in a current group of the nonvolatile registers is 0x00;
   judging whether the stored data of the flag register in the current group of the nonvolatile registers is 0xFF, in response to the stored data of the flag register in the current group of the nonvolatile registers being non-0x00; and
   the step of erasing all of the nonvolatile registers of the stored data of the at least one of the flag registers is the random code further comprises steps of: recording the stored data of the at least one data register in the last group of the nonvolatile registers that is in a non-writable state to a buffer, and erasing all of the nonvolatile registers, in response to the stored data of the flag register in the current group of the nonvolatile registers being non-0xFF.

2. The operating method according to claim 1, wherein the step of obtaining the stored data of the at least one of the flag registers comprises a step of: reading the stored data of each of the flag registers in all of the nonvolatile registers;
   the step of judging whether the stored data of the at least one of the flag registers is the random code comprises a step of: judging whether the stored data of the flag register in any group of the nonvolatile registers is non-0x00 and is non-0xFF; and
   the step of erasing all of the nonvolatile registers in response to the stored data of the at least one of the flag registers being the random code comprises steps of: recording the stored data of the at least one data register in a last group of the nonvolatile registers that is in a non-writable state to a buffer and erasing all of the nonvolatile registers, in response to the stored data of the flag register in any group of the nonvolatile registers being non-0x00 and is non-0xFF.

3. The operating method according to claim 1, wherein after the step of judging whether the stored data of the at least one of the flag registers is the random code, the operating method further comprises steps of:
   reading the stored data of each of the flag registers in the nonvolatile registers according to an address sequence from a first group of the nonvolatile registers to a last group of the nonvolatile registers, in response to the stored data of each of the flag registers in all of the nonvolatile registers being not the random code;
   judging whether the stored data of the flag register in a current group of the nonvolatile registers is 0xFF;
   judging whether the current group of the nonvolatile registers is the last group of the nonvolatile registers, in response to the stored data of the flag register in the current group of the nonvolatile registers being non-0xFF;

recording the stored data of the at least one data register in the last group of the nonvolatile registers that is in a non-writable state to a buffer before erasing all of the nonvolatile registers, in response to the current group of the nonvolatile registers being the last group of the nonvolatile registers; and writing data to be written to the first group of the nonvolatile registers, wherein the data to be written comprises flag data, unnecessary updated data of the stored data stored in the buffer, and data to be updated of the stored data stored in the buffer; the flag data is written to the flag register in the first group of the nonvolatile registers, the unnecessary updated data of the stored data stored in the buffer is correspondingly written to at least one data bit that do not need to be updated in the first group of the nonvolatile registers, and the data to be updated of the stored data stored in the buffer is correspondingly written to at least one data bit that needs to be updated in the first group of the nonvolatile registers.

4. The operating method according to claim 3, wherein after the step of judging whether the current group of the nonvolatile registers is the last group of the nonvolatile registers in response to the stored data of the flag register in the current group of the nonvolatile registers being non-0xFF, the operating method further comprises steps of:

scanning the at least one storage state of a next group of the nonvolatile registers and judging whether the stored data of the flag register in the current group of the nonvolatile registers is 0xFF, in response to the current group of the nonvolatile registers being not the last group of the nonvolatile registers.

5. The operating method according to claim 3, wherein after the step of judging whether the stored data of the flag register in the current group of the nonvolatile register is 0xFF, the operating method further comprises steps of:

judging whether the current group of the nonvolatile registers is the first group of the nonvolatile registers, in response to the stored data of the flag register in the current group of the nonvolatile registers being 0xFF;

directly writing the data to be written to the first group of the nonvolatile registers, in response to the current group of the nonvolatile registers being the first group of the nonvolatile registers; and recording the stored data of the flag register in a previous group of the current group of the nonvolatile registers to the buffer, and writing data to be written to the current group of the nonvolatile registers, in response to the current group of the nonvolatile registers being not the first group of the nonvolatile registers, wherein the data to be written stored in the current group of the nonvolatile registers comprises flag data, unnecessary updated data of the stored data stored in the buffer, and data to be updated of the stored data stored in the buffer; the flag data is written to the flag register in the current group of the data registers, the unnecessary updated data of the stored data stored in the buffer is correspondingly written to at least one data bit that do not need to be updated in the current group of the nonvolatile registers, and the data to be updated of the stored data stored in the buffer is correspondingly written to at least one data bit that needs to be updated in the current group of the nonvolatile registers.

6. The operating method according to claim 1, wherein after the step of judging whether the stored data of the flag register in the current group of the nonvolatile registers is 0x00, the operating method further comprises steps of:

judging whether the current group of the nonvolatile registers is the last group of the nonvolatile registers, in response to the stored data of the flag register in the current group of the nonvolatile registers being 0x00; and reading the stored data of the flag register in a remaining group of the nonvolatile registers and judging whether the stored data of the flag register in the current group of the nonvolatile registers is 0x00, in response to the current group of the nonvolatile registers being not the last group of the nonvolatile registers.

7. The operating method according to claim 6, wherein after the step of judging whether the current group of the nonvolatile registers is the last group of the nonvolatile registers in response to the stored data of the flag register in the current group of the nonvolatile registers being 0x00, the operating method further comprises steps of: after recording the stored data of the at least one data register in the last group of the nonvolatile registers in the non-writable state to the buffer, erasing all of the nonvolatile registers, and writing data to be written to the first group of the nonvolatile registers, in response to the current group of the nonvolatile registers being the last group of the nonvolatile registers; wherein the data to be written comprises flag data, unnecessary updated data of the stored data stored in the buffer, and data to be updated of the stored data stored in the buffer; the flag data is written to the flag register in the first group of the nonvolatile registers, the unnecessary updated data of the stored data stored in the buffer is correspondingly written to at least one data bit that do not need to be updated in the first group of the nonvolatile registers, and the data to be updated of the stored data stored in the buffer is correspondingly written to at least one data bit that needs to be updated in the first group of the nonvolatile registers.

8. The operating method according to claim 7, wherein after the step of judging whether the stored data of the flag register in the current group of the nonvolatile registers is 0xFF, in response to the stored data of the flag register in the current group of the nonvolatile registers being non-0x00, the operating method further comprises steps of:

storing a storage address of the current group of the nonvolatile registers, in response to the stored data of the flag register in the current group of the nonvolatile registers being 0xFF;

reading the stored data of the flag register in the remaining group of the nonvolatile registers;

judging whether the stored data of the flag register in the remaining group of the nonvolatile registers is the random code;

judging whether the current group of the nonvolatile registers corresponding to the storage address in a step "storing the storage address of the current group of the nonvolatile registers in response to the stored data of the flag register in the current group of the nonvolatile registers being 0xFF" is the first group of the nonvolatile registers, in response to the stored data of the flag register in the remaining group of the nonvolatile registers being not the random code; and directly writing the data to be written to the at least one data register of the current group of the nonvolatile registers, in response to the current group of the nonvolatile registers being the first group of the nonvolatile registers.

9. The operating method according to claim 8, wherein after the step of judging whether the current group of the nonvolatile registers corresponding to the storage address is the first group of the nonvolatile registers, the operating method further comprises steps of: recording the stored data of the at least one data register in a previous group of the nonvolatile registers to the buffer, and writing data to be written to the current group of the nonvolatile registers, in response to the current group of the nonvolatile registers being not the first group of the nonvolatile registers, wherein the data to be written stored in the current group of the nonvolatile registers comprises flag data, unnecessary updated data of the stored data stored in the buffer, and data to be updated of the stored data stored in the buffer; the flag data is written to the flag register in the current group of the nonvolatile registers, the unnecessary updated data of the stored data stored in the buffer is correspondingly written to at least one data bit that do not need to be updated in the current group of the nonvolatile registers, and the data to be updated of the stored data stored in the buffer is correspondingly written to at least one data bit that needs to be updated in the current group of the nonvolatile registers.

10. The operating method according to claim 8, wherein after the step of judging whether the stored data of the flag register in the remaining group of the nonvolatile registers is the random code, the operating method further comprises steps of:
recording the stored data of the at least one data register in the last group of the nonvolatile registers in the non-writable state to the buffer, and erasing all of the nonvolatile registers, in response to the stored data of the flag register in the remaining group of the nonvolatile registers being the random code; and
writing the data to be written to the first group of the nonvolatile registers.

11. A memory chip comprising:
at least two groups of nonvolatile registers, wherein each group of the nonvolatile registers comprises a flag register and at least one data register, and stored data of each of flag registers is configured to indicate at least one storage state of the at least one data register in a same group of the nonvolatile registers;
an obtaining module, wherein the obtaining module is configured to obtain the stored data of at least one of the flag registers;
a judgment module, wherein the judgment module is configured to judge whether the stored data of the at least one of the flag registers is random code;
a selective erasure module, wherein the selective erasure module is configured to erase all of the nonvolatile registers in response to the stored data of the at least one of the flag registers being the random code;
a first reading unit, wherein the first reading unit is configured to read the stored data of the flag registers from a first group of the nonvolatile registers to a last group of the nonvolatile registers according to an address sequence;
a first judgment unit, wherein the first judgment unit is configured to judge whether the stored data of the flag register in a current group of the nonvolatile registers is 0x00; in response to the stored data of the flag register in the current group of the nonvolatile registers being non-0x00, judging whether the stored data of the flag register in the current group of the nonvolatile registers is 0xFF; and in response to the stored data of the flag register in the current group of the nonvolatile registers being 0xFF, storing a storage address of the current group of the nonvolatile registers; and
a first selective erasure unit, wherein the first selective erasure unit is configured to record the stored data of the at least one data register in a last group of the nonvolatile registers that is in a non-writable state to a buffer, and to erase all of the nonvolatile registers in response to a fact that the stored data of the flag register in the current group of the nonvolatile registers is non-0xFF.

12. The memory chip according to claim 11, wherein the memory chip further comprises:
a second reading unit, wherein the second reading unit is configured to read the stored data of each of the flag registers in all of the nonvolatile registers;
a second judgment unit, wherein the second judgment unit is configured to judge whether the stored data of the flag register in any group of the nonvolatile registers is non-0x00 and is non-0xFF; and
a second selective erasure unit, wherein the second selective erasure unit is configured to record the stored data of the at least one data register in a last group of the nonvolatile registers that is in a non-writable state to a buffer in response to a fact that the stored data of the flag register in any group of the nonvolatile registers is non-0x00 and is non-0xFF.

13. An operating method of a memory chip, comprising steps of:
constructing the memory chip comprising at least two groups of nonvolatile registers, wherein each group of the nonvolatile registers comprises a flag register and at least one data register, and stored data of each of flag registers is configured to indicate at least one storage state of the at least one data register in a same group of the nonvolatile registers;
obtaining the stored data of at least one of the flag registers;
judging whether the stored data of the at least one of the flag registers is random code, wherein the random code are data being non-0x00 and being non-0xFF, wherein 0x00 represents binary data of 00000000, 0xFF represents binary data of 11111111, the non-0x00 represents binary data other than 00000000, and the non-0xFF represents binary data other than 11111111; and
erasing all of the nonvolatile registers in response to the stored data of the at least one of the flag registers being the random code;
wherein after the step of judging whether the stored data of the at least one of the flag registers is the random code, the operating method further comprises steps of:
reading the stored data of each of the flag registers in the nonvolatile registers according to an address sequence from a first group of the nonvolatile registers to a last group of the nonvolatile registers, in response to the stored data of each of the flag registers in all of the nonvolatile registers being not the random code;
judging whether the stored data of the flag register in a current group of the nonvolatile registers is 0xFF;
judging whether the current group of the nonvolatile registers is the last group of the nonvolatile registers, in response to the stored data of the flag register in the current group of the nonvolatile registers being non-0xFF;
recording the stored data of the at least one data register in the last group of the nonvolatile registers that is in a non-writable state to a buffer before erasing all of the nonvolatile registers, in response to the current group of the nonvolatile registers being the last group of the nonvolatile registers; and writing data to be written to the first group of the nonvolatile registers, wherein the data to be written comprises flag data, unnecessary updated data of the stored data stored in the buffer, and data to be updated of the stored data stored in the buffer; the flag data is written to the flag register in the first group of the nonvolatile registers, the unnecessary updated data of the stored data stored in the buffer is correspondingly written to at least one data bit that do not need to be updated in the first group of the nonvolatile registers, and the data to be updated of the stored data stored in the buffer is correspondingly written to at least one data bit that needs to be updated in the first group of the nonvolatile registers.

14. The operating method according to claim 13, wherein the step of obtaining the stored data of the at least one of the flag registers comprises a step of: reading the stored data of each of the flag registers in all of the nonvolatile registers;

the step of judging whether the stored data of the at least one of the flag registers is the random code comprises a step of: judging whether the stored data of the flag register in any group of the nonvolatile registers is non-0x00 and is non-0xFF; and the step of erasing all of the nonvolatile registers in response to the stored data of the at least one of the flag registers being the random code comprises steps of: recording the stored data of the at least one data register in a last group of the nonvolatile registers that is in a non-writable state to a buffer and erasing all of the nonvolatile registers, in response to the stored data of the flag register in any group of the nonvolatile registers being non-0x00 and is non-0xFF.

15. The operating method according to claim 13, wherein after the step of judging whether the current group of the nonvolatile registers is the last group of the nonvolatile registers in response to the stored data of the flag register in the current group of the nonvolatile registers being non-0xFF, the operating method further comprises steps of:

scanning the at least one storage state of a next group of the nonvolatile registers and judging whether the stored data of the flag register in the current group of the nonvolatile registers is 0xFF, in response to the current group of the nonvolatile registers being not the last group of the nonvolatile registers.

16. The operating method according to claim 13, wherein after the step of judging whether the stored data of the flag register in the current group of the nonvolatile register is 0xFF, the operating method further comprises steps of:

judging whether the current group of the nonvolatile registers is the first group of the nonvolatile registers, in response to the stored data of the flag register in the current group of the nonvolatile registers being 0xFF;

directly writing the data to be written to the first group of the nonvolatile registers, in response to the current group of the nonvolatile registers being the first group of the nonvolatile registers; and recording the stored data of the flag register in a previous group of the current group of the nonvolatile registers to the buffer, and writing data to be written to the current group of the nonvolatile registers, in response to the current group of the nonvolatile registers being not the first group of the nonvolatile registers, wherein the data to be written stored in the current group of the nonvolatile registers comprises flag data, unnecessary updated data of the stored data stored in the buffer, and data to be updated of the stored data stored in the buffer; the flag data is written to the flag register in the current group of the data registers, the unnecessary updated data of the stored data stored in the buffer is correspondingly written to at least one data bit that do not need to be updated in the current group of the nonvolatile registers, and the data to be updated of the stored data stored in the buffer is correspondingly written to at least one data bit that needs to be updated in the current group of the nonvolatile registers.

17. The operating method according to claim 13, wherein the step of obtaining the stored data of the at least one of the flag registers further comprises a step of: reading the stored data of the flag registers from a first group of the nonvolatile registers to a last group of the nonvolatile registers according to an address sequence; and wherein the step of judging whether the stored data of the at least one of the flag registers is the random code further comprises steps of:

judging whether the stored data of the flag register in a current group of the nonvolatile registers is 0x00;

judging whether the stored data of the flag register in the current group of the nonvolatile registers is 0xFF, in response to the stored data of the flag register in the current group of the nonvolatile registers being non-0x00; and the step of erasing all of the nonvolatile registers of the stored data of the at least one of the flag registers is the random code further comprises steps of: recording the stored data of the at least one data register in the last group of the nonvolatile registers that is in a non-writable state to a buffer, and erasing all of the nonvolatile registers, in response to the stored data of the flag register in the current group of the nonvolatile registers being non-0xFF.

18. The operating method according to claim 17, wherein after the step of judging whether the stored data of the flag register in the current group of the nonvolatile registers is 0x00, the operating method further comprises steps of:

judging whether the current group of the nonvolatile registers is the last group of the nonvolatile registers, in response to the stored data of the flag register in the current group of the nonvolatile registers being 0x00; and reading the stored data of the flag register in a remaining group of the nonvolatile registers and judging whether the stored data of the flag register in the current group of the nonvolatile registers is 0x00, in response to the current group of the nonvolatile registers being not the last group of the nonvolatile registers.

19. The operating method according to claim 18, wherein after the step of judging whether the current group of the nonvolatile registers is the last group of the nonvolatile registers in response to the stored data of the flag register in the current group of the nonvolatile registers being 0x00, the operating method further comprises steps of: after recording the stored data of the at least one data register in the last group of the nonvolatile registers in the non-writable state to the buffer, erasing all of the nonvolatile registers, and writing data to be written to the first group of the nonvolatile registers, in response to the current group of the nonvolatile registers being the last group of the nonvolatile registers; wherein the data to be written comprises flag data, unnecessary updated data of the stored data stored in the buffer, and data to be updated of the stored data stored in the buffer; the flag data is written to the flag register in the first group of the nonvolatile registers, the unnecessary updated data of the stored data stored in the buffer is correspondingly written to at least one data bit that do not need to be updated in the first group of the nonvolatile registers, and the data to be updated of the stored data stored in the buffer is correspondingly written to at least one data bit that needs to be updated in the first group of the nonvolatile registers.

20. The operating method according to claim 19, wherein after the step of judging whether the stored data of the flag register in the current group of the nonvolatile registers is 0xFF, in response to the stored data of the flag register in the current group of the nonvolatile registers being non-0x00, the operating method further comprises steps of:

storing a storage address of the current group of the nonvolatile registers, in response to the stored data of the flag register in the current group of the nonvolatile registers being 0xFF;

reading the stored data of the flag register in the remaining group of the nonvolatile registers;

judging whether the stored data of the flag register in the remaining group of the nonvolatile registers is the random code;

judging whether the current group of the nonvolatile registers corresponding to the storage address in a step "storing the storage address of the current group of the nonvolatile registers in response to the stored data of the flag register in the current group of the nonvolatile registers being 0xFF" is the first group of the nonvolatile registers, in response to the stored data of the flag register in the remaining group of the nonvolatile registers being not the random code; and directly writing the data to be written to the at least one data register of the current group of the nonvolatile registers, in response to the current group of the nonvolatile registers being the first group of the nonvolatile registers.

* * * * *